United States Patent
Hughes et al.

(10) Patent No.: US 6,565,918 B2
(45) Date of Patent: May 20, 2003

(54) BONDING OF RUBBER PARTICLES

(75) Inventors: Anthony Harold Hughes, Rawtenstall (GB); Stephen Pennington, Bury (GB)

(73) Assignee: Star Uretech Limited, Manchester (GB)

( * ) Notice: Subject to any disclaimer, the term of this patent is extended or adjusted under 35 U.S.C. 154(b) by 0 days.

(21) Appl. No.: 09/902,325

(22) Filed: Jul. 10, 2001

(65) Prior Publication Data

US 2002/0022086 A1 Feb. 21, 2002

(30) Foreign Application Priority Data

Jul. 11, 2000 (GB) .............................. 0016864

(51) Int. Cl.$^7$ .............................. B05D 5/00; B05D 7/00; C08L 17/00; C08L 21/00
(52) U.S. Cl. ................. 427/136; 427/180; 427/221; 427/222; 427/393.5; 427/400; 523/200
(58) Field of Search .................. 427/385.5, 180, 427/212, 222, 215, 221, 393.5, 400, 136; 523/200

(56) References Cited

U.S. PATENT DOCUMENTS

| | | | |
|---|---|---|---|
| 4,107,100 A | | 8/1978 | Peterhans et al. ........... 521/137 |
| 4,269,740 A | * | 5/1981 | Woods et al. ............... 525/235 |
| 4,614,686 A | * | 9/1986 | Coke et al. .................. 427/138 |
| 5,543,172 A | * | 8/1996 | Jakubisin et al. ........... 427/212 |
| 6,027,763 A | * | 2/2000 | Brown ........................ 427/136 |
| 6,036,998 A | * | 3/2000 | Calvo et al. ................. 427/214 |
| 6,103,783 A | * | 8/2000 | Hong .......................... 523/206 |

FOREIGN PATENT DOCUMENTS

| | | | |
|---|---|---|---|
| GB | 928120 | * | 6/1963 |
| GB | 2035336 | | 6/1980 |
| GB | 2249102 | * | 4/1992 |
| JP | 03-200851 | * | 9/1991 |
| WO | WO 91/06594 | | 5/1991 |

* cited by examiner

*Primary Examiner*—Erma Cameron
(74) *Attorney, Agent, or Firm*—Fay, Sharpe, Fagan, Minnich & McKee, LLP

(57) ABSTRACT

A coherent rubber composition is produced by: (a) coating the rubber particles with a polymeric unsaturated hydrocarbon compound; (b) mixing the resulting coated rubber particles with a bonding material; and (c) allowing and/or causing the resulting mixture to form the desired coherent rubber composition. The polymeric unsaturated hydrocarbon compound is conveniently a compound having a long chain aliphatic structure, for example a hydroxyl-substituted polymer of 1,3-butadiene. The bonding material is conveniently a pre-polymer for a polyurethane or polyurea, having terminal —NCO groups. Coherent rubber compositions obtained by the method are well suited for use as play surfaces or sports surfaces.

17 Claims, No Drawings

BONDING OF RUBBER PARTICLES

BACKGROUND OF THE INVENTION

This invention relates to a method of bonding together rubber particles into a coherent rubber composition using a urethane or other bonding material. In particular, the invention relates to the use of improved pre-coating agents which promote bonding action between the bonding material and the rubber particles. The invention further relates to rubber particles that have been treated with a pre-coating agent of the invention, to the coherent rubber compositions obtained as products of the method of the invention and to their use as sports surfaces or play surfaces.

A substantial industry has become established for the manufacture of rubber composition surfaces for use, for example, in children play areas (referred to herein as "play surfaces") and in surfaces on which games are played (referred to herein as "sports surfaces"). The rubber compositions produced for use in play surfaces and sports surfaces are conventionally produced by bonding together rubber particles using a urethane prepolymer. After mixing the rubber particles and prepolymer together the resulting liquid composition is spread on a substrate, for example in a mould so as to produce a tile or on the ground or similar substrate to produce an artificial surface in situ. Hitherto, such compositions have in many instances proved unsatisfactory in not being sufficiently coherent in use, resulting in an unduly short life of the laid surface. It is a generally accepted standard in the industry that the tensile strength of the rubber composition should be not less than 0.4 N/mm$^2$. However, it has been found that in order to attain consistently that value of tensile strength special care has to be taken in laying the composition, such as the use of high levels of bonding material.

It has previously been proposed to increase the degree of bonding between the rubber particles and polyurethane structure by coating (referred to hereinafter as "pre-coating") the rubber particles with a polyether polyol prior to mixing with the prepolymer. Although some benefit has been obtained in this way, the resulting increase in tensile strength has been slight.

SUMMARY OF THE INVENTION

It has now been found according to the present invention that a very substantial increase in tensile strength of the rubber composition product can be obtained by using particular novel pre-coating agents. The increased coherence obtained using the pre-coating agents of preferred embodiments of the invention is such as to give a marked degree of assurance that satisfactory reproducible results can be obtained.

Accordingly, in a first aspect the present invention provides a method of producing a coherent rubber composition from particles of rubber, which comprises:

(a) coating the rubber particles with a polymeric unsaturated hydrocarbon compound;

(b) mixing the resulting coated rubber particles with a bonding material; and (c) allowing and/or causing the resulting mixture to form the desired coherent rubber composition.

In a second aspect the present invention provides rubber particles having a coating thereon of a polymeric unsaturated hydrocarbon compound.

In a third aspect the present invention provides a process for producing from particles of rubber a layer of a coherent rubber composition suitable for use as a sports or play surface, which comprises:

(a) coating the rubber particles with a polymeric unsaturated hydrocarbon compound;

(b) mixing the resulting coated rubber particles with a bonding material;

(c) spreading the resulting mixture as a layer on a substrate; and (d) allowing and/or causing the resulting mixture to form the desired coherent rubber composition.

The process of the invention can be used, for example, to produce coherent rubber compositions either by moulding or by a wet pour procedure.

DETAILED DESCRIPTION OF THE PREFERRED EMBODIMENTS

The polymeric unsaturated hydrocarbon compound used as the pre-coating agent in this invention conveniently has a long chain aliphatic structure. Thus, for example, it can be derived from a polymer of a diene or other polyene, for example a polymer of 1,3-butadiene. The molecular weight of the pre-coating agent can, for example, be in a range up to about 9,000; for example it can be 1,500, 2,000, 2,500, 3,000, 3,500 or 4,000 or other value in the range 1,500 to 4,000. Good results have been obtained using a compound having a molecular weight of about 2,800.

In a preferred form of the invention the polymeric unsaturated hydrocarbon compound has terminal or other hydroxyl substitution. In particular, excellent results have been obtained using a hydroxyl-substituted polybutadiene, for example a terminally hydroxyl-substituted polybutadiene also known as hydroxyl-terminated polybutadiene (HTPB). HTPB has the following general formula:

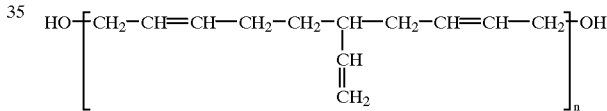

where n lies in the range 10 to 25, preferably 10 to 20, for example about 17. Where n=17 the calculated molecular weight for the dihydroxy substituted polybutadiene is 2788.

A hydroxyl-substituted polybutadiene that has been found to be most effective in the present invention, as illustrated in the Examples that follow, is the material sold under the trade mark LIQUIFLEX H by Petroflex Industria and Commercio SA. That material is a HTPB. It is obtained via free radical polymerisation and is characteristically an unsaturated liquid homopolymer with a number average molecular weight of 2800 and a degree of polymerisation of about 50. Its backbone microstructure is configured similarly to that of butadiene-styrene copolymers prepared by cold emulsion polymerisation. Typical properties of LIQUIFLEX H are as follows:

| | |
|---|---|
| Nonvolatile Material (% weight) | 99.5 min |
| Viscosity at 25° C. (Poise) | 40–70 |
| Hydroxyl Number (mg KOH/g) | 47.12 ± 2.24 |
| Hydroxyl Value (meq/g) | 0.840 ± 0.040 |
| Iodine Number (gI$_2$/100 g) | 500 max |
| Number Average Molecular Weight | 2750 |
| Moisture Content (ppm) | 500 max |

The microstructure of the HTPB has three types of unsaturation, as follows:

| Type | Proportion |
| --- | --- |
| trans 1,4 | 60% |
| cis 1,4 | 20% |
| vinyl type | 20% |

Further data regarding HTPB is given in a brochure of Petroflex Industria and Commercio SA under the title "Hydroxyl-terminated polybutadiene; a versatile polyol for the elastomer industry".

In the light of the results obtained and referred to below, it is believed to be preferable to use a pre-coating agent which is a hydroxyl-substituted polyolefin having a branch chain structure, in particular a structure which contains one or more allyl groups.

With regard to the quantity in which the pre-coating agent is used, suitable amounts are, for example, 0.2% or more of the weight of the rubber particles, especially an amount in the range 0.2 to 0.7%, for example 0.5%.

The pre-coating agent can be applied to the rubber particles using any convenient procedure. However, excellent results have been obtained by mixing the pre-coating agent with the rubber particles, for example by mechanically mixing the pre-coating agent either in a single added amount or in two or more separate amounts.

The bonding material used to bond together the pre-coated rubber particles is conveniently a prepolymer having terminal —NCO groups such as those conventionally used as moisture-curing adhesives. In the method of the invention the prepolymer is converted into a polyurethane and/or polyurea structure by allowing or causing it to react with water (for example in the form of atmospheric water vapour) or other suitable hydroxyl-containing compounds which cause or allow the prepolymer to cure to produce a polyurethane and/or polyurea structure. Where the production of that structure is carried under controlled conditions, for example in the preparation of tiles or other moulded sheet products, the curing can be expedited by the use of elevated temperatures.

The rubber particles used in the method of the present invention can be in any suitable physical form, for example in the form of powder, granules or crumb. In general, excellent results have been obtained using the rubber in the form of crumb, for example crumb having a dimension of 2–4 mm that is crumb passing a 4 mm mesh but retained on a 2 mm mesh. The crumb is conveniently one that has been obtained by the comminution of old motor vehicle tires or other scrap rubber, or can be manufactured specifically for this use, such as the product known as SPECTRUFLEX from Rushden Playsafe Ltd.

In order to reduce the viscosity of the hydroxyl-terminated polybutadiene it has been found beneficial to use it in conjunction with a small amount of a plastisiser (for example diisodecyl phthalate) or a small amount of a solvent (for example methylene chloride). Such viscosity-reducing additives can be used, for example, in an amount of 10 to 40 especially 15 to 25% by weight of the hydroxyl-terminated polybutadiene. As shown in Table II below satisfactory results have been obtained using such additives in an amount of 20% by weight of the hydroxyl-terminated polybutadiene. Moreover, use of the additives in that amount has had no detrimental effect on the tensile strength or elongation of the resulting product.

There is now described, by way of example, a method for the production of a coherent rubber composition using a hydroxyl-terminated polybutadiene pre-coating agent according to the first aspect of the invention. That method is described in Examples 1 to 4 below; comparative methods are described in Comparative Examples A to F.

EXAMPLE 1

300 g. of rubber particles in the form of 2–4 mm granulated tire scrap was charged to a 2.5 liter mixing vessel and 1.5 g (i.e. 0.5% w/w) of a liquid hydroxyl-terminated polybutadiene was added as a pre-coating agent. The mixture of rubber particles and hydroxyl-terminated polybutadiene was agitated for one minute thereby causing the rubber particles to be coated over substantially their entire surface area with the hydroxyl-terminated polybutadiene. The coated rubber particles material is according to said second aspect of the invention.

At the end of said one minute the rubber particles thus coated were mixed with 54 g of a polyurethane prepolymer that had been obtained by reacting a mixture of 2,4' diphenylmethane diisocyanate and 4,4' diphenylmethane diisocyanate with a mixture of 5 parts of a 2000 molecular weight polyoxypropylene polyether diol an 1 part of castor oil. The product contains free isocyanate groups and has an NCO value of about 10%.

The prepolymer and coated rubber crumb were agitated vigorously together for two minutes during which time the rubber crumb became completely coated by the prepolymer. The resulting mixture was poured into a mould 170×170×20 mm, a lid placed on the mould so as to compress the contents by 5 mm in height and allowed to cure by reaction with atmospheric moisture overnight. The resultant test square of approximate dimensions 170×170×15 mm was removed from the mould and allowed to cure for a further 24 hours at room temperature followed by 72 hours at 40° C. and >65% relative humidity to achieve full cure. The resulting product had a density of about 0.85 g/cm$^2$.

A test piece of length of 60 mm and a width of 12.5 mm was cut from this moulded product using a press and die. This test piece was then stretched to breaking point using a tensometer capable of stretching at 100 mm/min and measuring the peak tensile strength and elongation at peak. Each test was performed six times and the results averaged.

As shown in the following Table, the test piece had an average tensile strength of 1.24 N/mm$^2$ and an average elongation of 83.9%.

The pre-coating agent used in this Example was a product obtained from Petroflex Industria & Commercio S.A. and sold under the Trade Mark LIQUIFLEX H. The nature of that material is described above.

COMPARATIVE EXAMPLES A TO D

In four Comparative Examples A to D the method of Example 1 was repeated to produce a coherent rubber product but using as a pre-coating agent, instead of HTPB, one of the following substances:

| Comparative Example | Pre-coating agent |
| --- | --- |
| A | a polyether polyol having a high proportion of ethylene oxide |
| B | di-isodecyl phthalate |
| C | castor oil |
| D | methylene chloride |

The polyether polyol of Comparative Example A was a material similar to the polyol used to produce the prepolymer in Example 1 but containing a higher level of ethylene oxide.

The coherent rubber product of each of Comparative Examples A to D was cured and tested by the procedures described in Example 1. The results thus obtained are shown in Table I below.

COMPARATIVE EXAMPLE E

In this comparative Example a rubber product was obtained by the method of Example 1 but without using a pre-coating agent. Thus, the prepolymer was mixed directly with the rubber particles. The resulting rubber product was cured and tested by the procedures described in Example 1. The results obtained as shown in the Table I below.

TABLE I

| Ex-ample | Pre-coating agent | Average tensile Strength (N/mm$^2$) Value | Average tensile Strength (N/mm$^2$) Increase % | Average Elongation Value (%) | Average Elongation Increase % |
|---|---|---|---|---|---|
| A | A polyol (high ethylene oxide content) | 0.835 | 3.8 | 60.0 | 4.9 |
| B | Diisodecyl phthalate | 0.865 | 7.5 | 61.4 | 7.3 |
| C | Castor Oil | 0.874 | 8.7 | 59.5 | 4.0 |
| D | Methylene chloride | 0.864 | 7.5 | 65.1 | 13.8 |
| E | None | 0.804 | — | 57.2 | — |
| 1 | HTPB | 1.24 | 54.2 | 83.9 | 46.6 |

In the tables in this specification the term "Increase %" under the headings "Average tensile strength" and "Average Elongation" refers to increase over the value shown for the Example where no precoating agent is used.

From Table I it will be seen that where a pre-coating agent other than HTPB was used the increases in tensile strength were in the range 3.8 to 8.7% and the increases in elongation were in the range 4.0 to 13.8. However, where HTPB was used as the pre-coating agent the increase in tensile strength was 54.2% and the increase in elongation was 46.6%.

EXAMPLE 2

The procedure of Example 1 was repeated except that instead of the prepolymer of Example 1 there was used an alternative prepolymer that had been made by reacting a mixture of 4,4' diphenyl methane diisocyanate, 2,4 toluene diisocyanate and 2,6 toluene diisocyanate with a polyether polyol of 2,000 molecular weight without the addition of castor oil. The pre-coating agent used, as in Example 1, was 1.5 g of HTPB.

EXAMPLE 3

The procedure of Example 2 was repeated except that as the pre-coating agent there was used a mixture of 1.5 g of HTPB and 0.3 g of diisodecyl phthalate.

EXAMPLE 4

The procedure of Example 2 was repeated except that as the pre-coating agent there was used a mixture of 1.5 g of HTPB and 0.3 g of methylene chloride.

COMPARATIVE EXAMPLE F

The procedure of Example 2 was repeated except that no pre-coating agent was used.

From the cured products of Examples 2, 3 and 4 and Comparative Example F test pieces were cut and tested by the procedures described in Example 1 above. The test results obtained are shown in Table II below.

TABLE II

| Ex-ample | Pre-coating agent | Average tensile Strength (N/mm$^2$) Value | Average tensile Strength (N/mm$^2$) Increase % | Average Elongation Value (%) | Average Elongation Increase % |
|---|---|---|---|---|---|
| 2 | HTPB | 1.011 | 57.2 | 122.8 | 49.7 |
| 3 | HTPB + diisodecyl phthalate | 1.063 | 65.3 | 123.2 | 50.2 |
| 4 | HTPB + methylene chloride | 1.086 | 68.9 | 127.5 | 55.5 |
| F | None | 0.643 | — | 82 | — |

Having thus described the preferred embodiments, the invention is now claimed to be:

1. A method of producing a rubber composition from particles of rubber which comprises:
    (a) coating the rubber particles with a polymeric unsaturated hydrocarbon compound which comprises a hydroxyl-substituted polymer of a diene or other polyene; and
    (b) bonding the resulting coated rubber particles with a bonding material to form the rubber composition.

2. A method according to claim 1, wherein the polymeric unsaturated hydrocarbon compound is a polymer of 1,3-butadiene.

3. A method of producing a rubber composition from particles of rubber which comprises:
    (a) coating the rubber particles with a hydroxyl-substituted polybutadiene;
    (b) mixing the resulting coated rubber particles with a bonding material; and
    c) allowing and/or causing the resulting mixture to form the rubber composition.

4. A method according to claim 3, wherein the hydroxyl-substituted polybutadiene has a branch-chain structure.

5. A method according to claim 3, wherein the hydroxyl-substituted polybutadiene contains one or more allyl groups.

6. A method according to claim 3, wherein the hydroxyl-substituted polybutadiene is used in an amount in the range 0.2 to 0.7% by weight of the rubber particles.

7. A method according to claim 3, wherein the bonding material is a pre-polymer for a polyurethane or polyurea, having terminal-NCO groups.

8. A method according to claim 3, wherein the hydroxyl-substituted polybutadiene has a molecular weight of up to 9,000.

9. A method according to claim 8, wherein said molecular weight is in the range 1,500 to 4,000.

10. A method according to claim 3, wherein the hydroxyl-substituted polybutadiene has a terminal hydroxyl substituent.

11. The method according to claim 3 further including:
    between steps (b) and (c), spreading the mixture of coated rubber particles and bonding material on a substrate.

12. The method according to claim 3 further including:
    after step (b) and before step (c), laying the mixture of coated rubber particles and bonding material on a ground surface to provide a play surface or a sports surface.

13. The method according to claim 3 further including:
    after step (b) and before step (c), molding the mixture of coated rubber particles and bonding material to provide a mat, sheet, or other article.

14. A process for producing from particles of rubber a coherent rubber composition suitable for use as a sports or play surface, which comprises:
- (a) coating the rubber particles with a polymeric unsaturated hydrocarbon compound comprising a hydroxyl-substituted polymer of a diene;
- (b) mixing the resulting coated rubber particles with a bonding material;
- (c) spreading the resulting mixture on a substrate; and,
- (d) allowing and/or causing the resulting mixture to form the desired coherent rubber composition.

15. A coherent rubber composition that has been obtained by the process of claim 14.

16. A coherent rubber composition according to claim 15, in the form of a laid play surface or sports surface.

17. A coherent rubber composition according to claim 15, in the form of a mat, sheet or other moulded article.

* * * * *